US012143815B2

(12) United States Patent
Tamai

(10) Patent No.: US 12,143,815 B2
(45) Date of Patent: Nov. 12, 2024

(54) WIRELESS COMMUNICATION SYSTEM, WIRELESS COMMUNICATION METHOD AND NON-TRANSITORY COMPUTER-READABLE MEDIUM STORING WIRELESS COMMUNICATION PROGRAM

(71) Applicant: NEC Platforms, Ltd., Kawasaki (JP)

(72) Inventor: Takanori Tamai, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 363 days.

(21) Appl. No.: 17/636,416

(22) PCT Filed: Aug. 21, 2020

(86) PCT No.: PCT/JP2020/031743
§ 371 (c)(1),
(2) Date: Feb. 18, 2022

(87) PCT Pub. No.: WO2021/039676
PCT Pub. Date: Mar. 4, 2021

(65) Prior Publication Data
US 2022/0338005 A1 Oct. 20, 2022

(30) Foreign Application Priority Data
Aug. 26, 2019 (JP) .................................. 2019-153537

(51) Int. Cl.
*H04W 12/06* (2021.01)
*H04W 4/80* (2018.01)

(52) U.S. Cl.
CPC ............ *H04W 12/06* (2013.01); *H04W 4/80* (2018.02)

(58) Field of Classification Search
None
See application file for complete search history.

(56) References Cited

U.S. PATENT DOCUMENTS 6,772,331 B1 *  8/2004  Hind ...................... G06F 21/445
                                                      707/999.009
7,174,130 B2 *  2/2007  Kurisko ................ H04W 12/50
                                                      455/411
(Continued)

FOREIGN PATENT DOCUMENTS

JP    2004-072546 A   3/2004
JP    2005-136529 A   5/2005
(Continued)

OTHER PUBLICATIONS

International Search Report for PCT Application No. PCT/JP2020/031743, mailed on Nov. 2, 2020.
(Continued)

*Primary Examiner* — Kenneth B Wells

(57) ABSTRACT

A wireless repeater holds control information for controlling a communication status of a first wireless communication path for short-range wireless communication and authentication data required to permit short-range wireless communication, automatically permits connection when receiving a connection request using the first wireless communication path from the mobile terminal, determines, when receiving an authentication request with authentication data requesting a start of wireless communication from the connected mobile terminal, whether to authenticate the authentication-request-source mobile terminal, based on a result of comparing the authentication data attached to the authentication request from the mobile terminal with the authentication data held in the wireless repeater, and sets, when the mobile terminal is authenticated, a status of the wireless repeater to a status for performing wireless communication with the mobile terminal using the first wireless communication path.

8 Claims, 7 Drawing Sheets

(56) References Cited

U.S. PATENT DOCUMENTS

| | | | | |
|---|---|---|---|---|
| 7,215,649 | B2* | 5/2007 | Yu | H04M 1/72412 |
| | | | | 370/257 |
| 7,421,266 | B1* | 9/2008 | Bruestle | H04W 12/06 |
| | | | | 379/189 |
| 7,813,715 | B2* | 10/2010 | McKillop | H04W 12/50 |
| | | | | 455/410 |
| 7,907,901 | B1* | 3/2011 | Kahn | H04W 12/50 |
| | | | | 455/41.1 |
| 7,991,161 | B2* | 8/2011 | Chen | H04L 63/083 |
| | | | | 455/403 |
| 8,417,936 | B2* | 4/2013 | Iwao | H04L 9/12 |
| | | | | 713/150 |
| 8,432,261 | B2* | 4/2013 | Talty | H04L 63/0823 |
| | | | | 340/572.1 |
| 8,472,874 | B2* | 6/2013 | Tang | H04W 12/50 |
| | | | | 370/313 |
| 8,750,799 | B2* | 6/2014 | Giles | H04W 4/21 |
| | | | | 455/41.2 |
| 9,026,053 | B2* | 5/2015 | Molettiere | A61B 5/112 |
| | | | | 455/41.2 |
| 9,125,059 | B2* | 9/2015 | Hansmann | H04W 12/04 |
| 9,197,409 | B2* | 11/2015 | Roth | H04L 9/3242 |
| 9,210,727 | B2* | 12/2015 | Widner | H04W 76/11 |
| 9,361,619 | B2* | 6/2016 | Varadarajan | G06Q 20/405 |
| 9,609,677 | B2* | 3/2017 | Tan | H04W 12/08 |
| 9,743,267 | B2* | 8/2017 | Schuler | H04W 4/80 |
| 9,763,063 | B2* | 9/2017 | Kumar | H04W 4/80 |
| 9,814,084 | B2* | 11/2017 | Sidhu | H04W 76/10 |
| 9,907,105 | B2* | 2/2018 | Jales | H04W 76/14 |
| 9,949,065 | B1* | 4/2018 | Zarakas | G06Q 20/354 |
| 9,998,437 | B2* | 6/2018 | Kim | H04L 63/0876 |
| 10,115,256 | B2* | 10/2018 | Davis | H04W 12/08 |
| 10,826,895 | B1* | 11/2020 | Krut | H04L 9/0894 |
| 10,924,925 | B2* | 2/2021 | Sachs | H04W 12/47 |
| 11,288,667 | B2* | 3/2022 | Kang | G06Q 20/3278 |
| 11,627,469 | B2* | 4/2023 | Wong | H04W 12/108 |
| | | | | 726/6 |
| 2006/0268743 | A1 | 11/2006 | Yoshida | |
| 2015/0271858 | A1 | 9/2015 | Chu et al. | |

FOREIGN PATENT DOCUMENTS

| | | |
|---|---|---|
| JP | 2006-332863 A | 12/2006 |
| JP | 2007-188375 A | 7/2007 |
| JP | 2007-259386 A | 10/2007 |
| JP | 2008-236150 A | 10/2008 |
| JP | 2013-115564 A | 6/2013 |
| JP | 2016-504777 A | 2/2016 |
| JP | 2018-042189 A | 3/2018 |

OTHER PUBLICATIONS

JP Office Action for JP Application No. 2019-153537, mailed on Oct. 27, 2020 with English Translation.
JP Office Action for JP Application No. 2019-153537, mailed on Mar. 16, 2021 with English Translation.

* cited by examiner

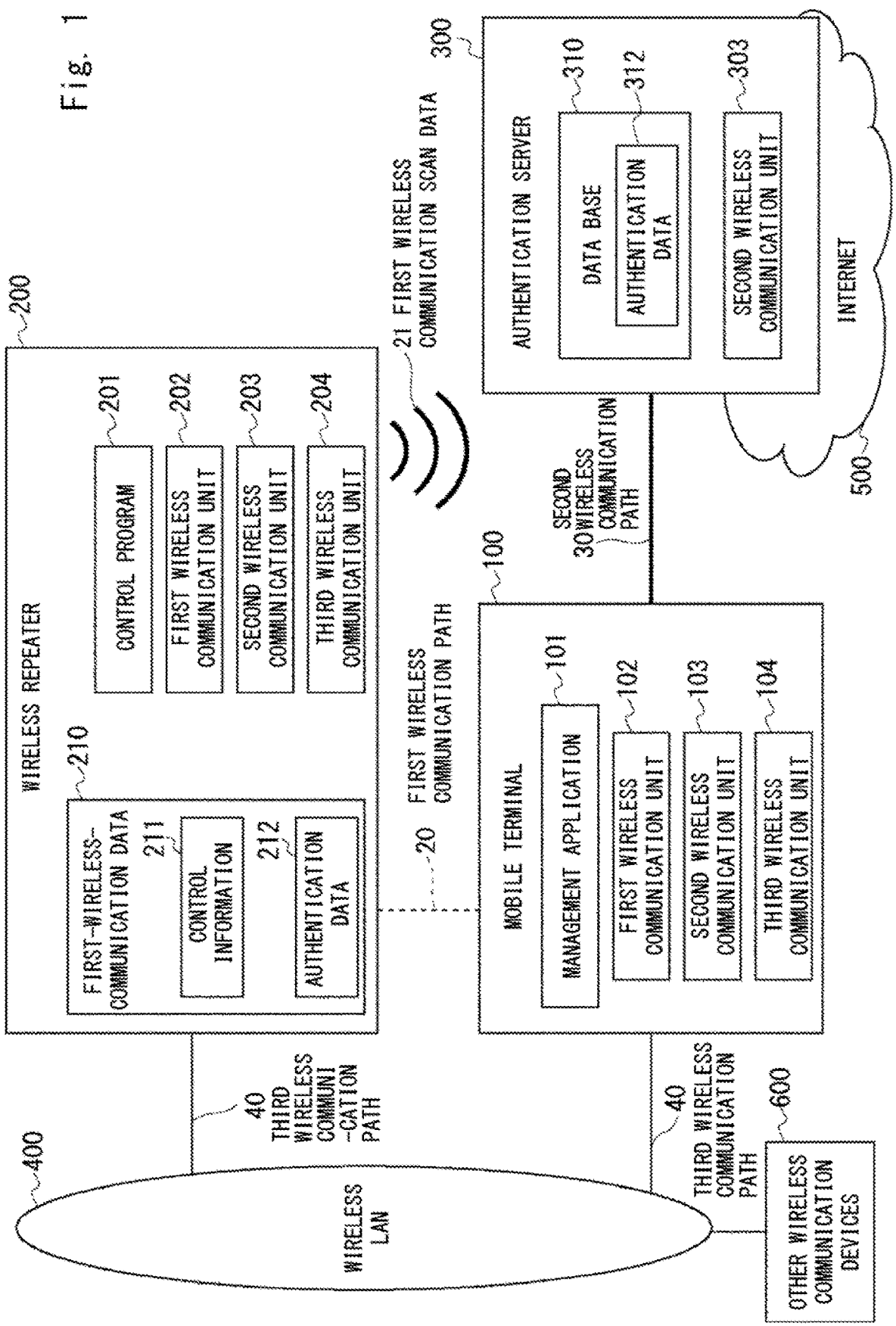

WIRELESS COMMUNICATION SYSTEM, WIRELESS COMMUNICATION METHOD AND NON-TRANSITORY COMPUTER-READABLE MEDIUM STORING WIRELESS COMMUNICATION PROGRAM

This application is a National Stage Entry of PCT/JP2020/031743 filed on Aug. 21, 2020, which claims priority from Japanese Patent Application 2019-153537 filed on Aug. 26, 2019, the contents of all of which are incorporated herein by reference, in their entirety.

TECHNICAL FIELD

The present invention relates to a wireless communication system, a wireless communication method, and a wireless communication program, and particularly relates to a wireless communication system, a wireless communication method, and a wireless communication program that enable acquisition of authentication for wireless communication between a wireless repeater such a wireless router and a mobile terminal such as a smartphone in short-range wireless communication such as 'Bluetooth (registered trademark) Low Energy (BLE)' even in an environment in which a user's operation is impossible.

BACKGROUND ART

In recent years, portable terminals (mobile terminals) such as smartphones and laptop computers have been remarkably used. Accordingly, mobile terminals are connected to wireless communication devices using Bluetooth technology, which is one of short-range wireless communication methods, and are increasingly used as wireless communication terminals to perform communication with connected wireless communication devices. Here, examples of connection to wireless communication devices are, for example, connection to wireless repeaters such as wireless routers, connection to earphones, and the like.

Furthermore, in recent years, increasing users have connected their wireless communication terminals such as mobile terminals such as smartphones and laptop computers to wireless repeaters such as wireless routers, using a Bluetooth standard wireless communication technology, which is an example of a short-range wireless communication technology, to change the settings related to wireless communication by the wireless repeaters to the users' desired settings. Here, connection has been increasingly performed using a low-power connection mode such as Bluetooth Low Energy (hereinafter, abbreviated to 'BLE'), which has been added as version 4.0 of the Bluetooth standard that is an example of the short-range wireless communication technology.

In the case of 'BLE' connection, in order to limit wireless communication terminals capable that can connect to a wireless communication device, pairing requiring manual operation is generally performed when connection is started. Pairing means that both wireless communication devices (for example, a mobile terminal and a wireless repeater) that desire connection to each other perform operation of exchanging activation keys between the wireless communication devices to set a status in such a manner as to perform wireless communication between the wireless communication devices.

On the other hand, in the case of mobile terminals such as smartphones and laptop computers, there are increasing situations where users (drivers) are prohibited from operating their mobile terminals while, for example, driving a car as a communication environment. However, when pairing is performed in order for a mobile terminal such as a smartphone or a laptop computer is connected to a wireless repeater such as an in-vehicle wireless router by Bluetooth connection, it is required for both the mobile terminal and the wireless communication device to perform authentication, and both the mobile terminal and the wireless communication device require manual pre-operation. Thus, pairing cannot be performed in a wireless communication environment where the operation of mobile terminals and the like is prohibited, and it is difficult to respond to urgent requests for wireless communication in many cases.

In order to deal with such a situation, for example, Patent Literature 1, Published Japanese Translation of PCT International Publication for Patent Application, No. 2016-504777 titled "Bluetooth-based system for automatically matching vehicle-mounted device with mobile phone terminal", discloses a technique for enabling automatic pairing during driving a car. In other words, in Patent Literature 1, the Bluetooth functions of the in-vehicle wireless repeater and the mobile terminal are controlled ON/OFF by a signal from the car ignition switch in order to enable Bluetooth connection during driving the car. Then, when the car ignition switch is ON, the Bluetooth functions of both the in-vehicle wireless repeater and the mobile terminal are turned ON, and pairing for Bluetooth connection is automatically performed in the proposed technique.

CITATION LIST

Patent Literature

Patent Literature 1: Published Japanese Translation of PCT International Publication for Patent Application, No. 2016-504777

SUMMARY OF INVENTION

However, in current techniques such as Patent Literature 1 related to the present invention, there are the following problems.

In the case of, for example, the technique disclosed in Patent Literature 1, in a wireless communication environment where a mobile terminal such as a smartphone or a laptop computer cannot be operated during driving a car or the like as described above, pairing between the wireless repeater and the mobile terminal is automatically performed by a signal from the car ignition switch to set a status in such a manner as that the wireless repeater and the mobile terminal are communicable. In other words, pairing is enabled without manual operation in both the wireless repeater and the mobile terminal.

However, if the technique disclosed in Patent Literature 1 is employed, it is impossible to limit mobile terminals to be paired with a connection-target wireless repeater, which means wireless communication terminals of unexpected third persons can be paired, and causes a problem that the unexpected third persons are permitted to access or operate the settings of the wireless repeater. In other words, it can be said that the automatic pairing system disclosed in Patent Literature 1 or the like is equivalent to a system that does not perform pairing operation for deterring unauthorized connection.

In addition, if mobile terminals permitted to be paired with a connection-target wireless repeater are limited to mobile terminals having a predetermined specific attribute value, this is not a fundamental solution because it is easy to disguise such a specific attribute value.

Note that, as described in the above Background Art, if current general pairing is performed as authentication operation for deterring unauthorized connection, manual operation of preparing pairing is required when a mobile terminal is connected to a wireless repeater for the first time as described above, which extremely takes time and labor and remains the problem to be solved by the present invention that connection to a connection-target wireless repeater cannot be performed in a wireless communication environment where a wireless communication terminal such as a mobile terminal cannot be operated.

In view of the above problem, a purpose of the present disclosure is to provide a wireless communication system, a wireless communication method, and a wireless communication program that automatically perform authentication operation required for a start of wireless communication without the need for manual operation in order to start short-range wireless communication between a mobile terminal and a wireless repeater.

In order to solve the above problem, a wireless communication system, a wireless communication method, and a wireless communication program according to the present invention mainly employ the following characteristic configurations.

(1) A wireless communication system according to the present invention is a wireless communication system comprising a mobile terminal including a short-range wireless communication function and a wireless repeater, wherein the wireless repeater is configured:

to hold at least control information for controlling a communication status of a first wireless communication path for short-range wireless communication, and authentication data required to permit wireless communication with its own wireless repeater using the first wireless communication path;

to automatically permit connection without a manual operation when receiving a connection request using the first wireless communication path from the mobile terminal;

to determine, when receiving an authentication request to which authentication data is attached requesting a start of wireless communication with its own wireless repeater using the first wireless communication path from the mobile terminal that has been in a status connected, whether to authenticate the authentication-request-source mobile terminal, based on a result of comparing the authentication data attached to the authentication request from the mobile terminal with the authentication data held in its own wireless repeater; and to set, when the mobile terminal has been authenticated, a status of the wireless repeater to a status for performing wireless communication with the mobile terminal using the first wireless communication path.

(2) A wireless communication method according to the present invention is a wireless communication method for a wireless communication system comprising a mobile terminal including a short-range wireless communication function and a wireless repeater, the method comprising:

holding, by the wireless repeater, at least control information for controlling a communication status of a first wireless communication path for short-range wireless communication, and authentication data required to permit wireless communication with its own wireless repeater using the first wireless communication path;

automatically permitting, by the wireless repeater, connection without a manual operation when a connection request using the first wireless communication path is received from the mobile terminal;

determining, by the wireless repeater, when an authentication request to which authentication data is attached requesting a start of wireless communication with its own wireless repeater using the first wireless communication path is received from the mobile terminal that has been in a status connected, whether to authenticate the authentication-request-source mobile terminal, based on a result of comparing the authentication data attached to the authentication request from the mobile terminal with the authentication data held in its own wireless repeater; and setting, by the wireless repeater, a status of the wireless repeater to a status for performing wireless communication with the mobile terminal using the first wireless communication path when the mobile terminal has been authenticated.

(3) A wireless communication program according to the present invention is a wireless communication program to be executed in a wireless communication system comprising a mobile terminal including a short-range wireless communication function and a wireless repeater by a computer mounted in the wireless repeater, the program causing the wireless repeater to execute:

holding at least control information for controlling a communication status of a first wireless communication path for short-range wireless communication, and authentication data required to permit wireless communication with its own wireless repeater using the first wireless communication path;

automatically permitting, when a connection request using the first wireless communication path is received from the mobile terminal, connection without a manual operation;

determining, when an authentication request to which authentication data is attached requesting a start of wireless communication with its own wireless repeater using the first wireless communication path is received from the mobile terminal that has been in a status connected, whether to authenticate the authentication-request-source mobile terminal, based on a result of comparing the authentication data attached to the authentication request from the mobile terminal with the authentication data held in its own wireless repeater; and setting, when the mobile terminal has been authenticated, a status of the wireless repeater to a status for performing wireless communication with the mobile terminal using the first wireless communication path.

With a wireless communication system, a wireless communication method, and a wireless communication program according to the present invention, it is possible to mainly achieve the following effects.

It is possible to automatically and quickly connect a mobile terminal to a wireless repeater without any operation by users of the mobile terminal and the wireless repeater, and to deter a communication terminal of a third person who is not authenticated from improperly accessing control information set in the wireless repeater as information indicating a communication status of a wireless communication path because the mobile terminal is permitted to access the control information in the wireless repeater only when the mobile terminal is authenticated by the wireless repeater.

BRIEF DESCRIPTION OF DRAWINGS

FIG. 1 is a system configuration diagram showing a system configuration example of a wireless communication system in a first example embodiment according to the present invention;

DESCRIPTION OF EMBODIMENTS

Figure 2A:
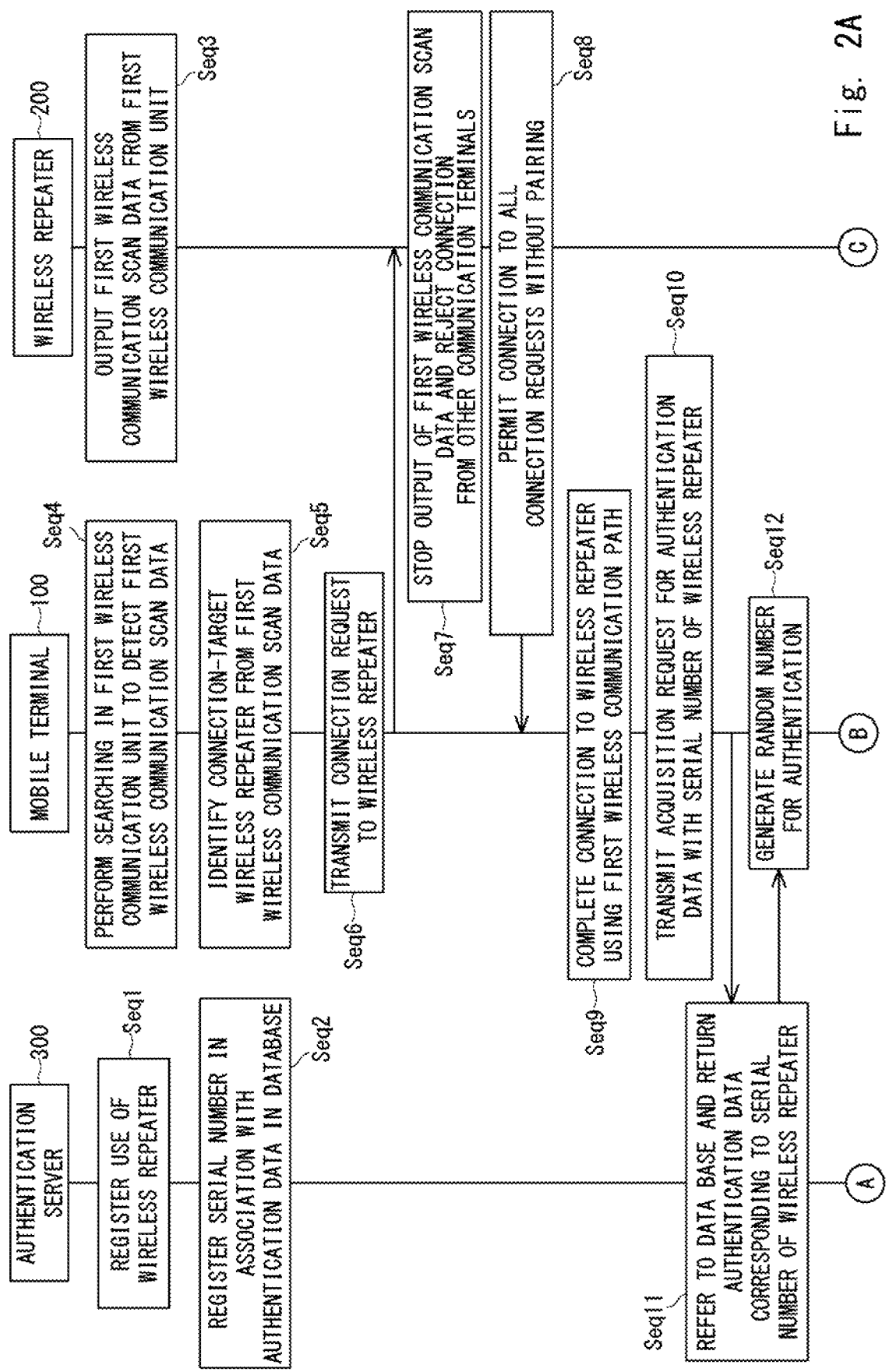
FIGS. 2A and 2B are a sequence chart for explaining an example of the operation of the wireless communication system shown in FIG. 1.

Hereinafter, preferred example embodiments of a wireless communication system, a wireless communication method, and a wireless communication program according to the present invention will be described with reference to the accompanying drawings. Note that, the wireless communication system and the wireless communication method according to the present invention will be described below, but it is needless to say that the wireless communication method may be implemented as a wireless communication program executable by a computer or that the wireless communication program may be stored in a recording medium readable by a computer. In addition, it is needless to say that the reference signs in the following drawings are assigned to elements for convenience as an example to facilitate understanding, and are not intended to limit the present invention to the illustrated aspects.

(Features of the Present Invention)

Before example embodiments of the present invention are described, the features of the present invention are outlined first. The present invention relates to connection control for a wireless communication system, and the main feature is to automatically connect, when a mobile terminal such as a smartphone or a laptop computer is to be connected to a wireless repeater such as a wireless router using a short-range wireless communication technology such as Bluetooth, the mobile terminal to the wireless repeater without the need for manual operation related to pairing between the mobile terminal and the wireless repeater, and to restrict the wireless communication between the mobile terminal and the wireless repeater after connection using an authentication means specific to the present invention in order to deter unauthorized wireless communication and operation to the wireless repeater by a wireless communication terminal, a wireless communication device, or the like of a third person who does not have the authentication means.

As the authentication means specific to the present invention, for example, authentication data for wireless repeaters that are connection targets of mobile terminals is preset and preregistered in an authentication server installed in the internet, and an authentication means using the authentication server is provided. Then, by the authentication server centrally managing access permissions to each wireless repeater that is the connection target of each mobile terminal, it is possible to deter a mobile terminal of a third person who does not have the access means to the authentication server from unauthorized wireless communication with the wireless repeater. Here, the authentication data for the wireless repeater set and registered in the authentication server is the data required to acquire authentication from the wireless repeater when the mobile terminal requests a start of the wireless communication with the wireless repeater using a first wireless communication path for short-range wireless communication.

In addition, another main feature is that the need for manual operation by the users of a mobile terminal and a wireless repeater is eliminated including the first time wireless communication, and thereby the users of a mobile terminal and a wireless repeater are not required to perform any operation related to connection when the mobile terminal is to be connected to the wireless repeater, unlike a short-range wireless communication technology such as normal pairing operation of Bluetooth.

Example Embodiments of the Present Invention

Next, example embodiments of the present invention are described. Note that, a communication mode used as short-range wireless communication in the following description of the example embodiments employs a communication mode of "Bluetooth" as an example. Here, the communication mode of "Bluetooth" employs a communication mode of "Bluetooth Low Energy (BLE) which was added and established in the Bluetooth version 4.0 standard. Although 'BLE' has a slow communication speed, its feature is to require low power consumption. In addition, an "authentication server" used in the following description of the example embodiments is a server installed in the internet, and preregisters and holds authentication data for a wireless repeater such as a wireless router which is a connection target of a mobile terminal (wireless communication terminal) such as a smartphone or a laptop computer. Note that, the authentication data for the wireless repeater held in the authentication server is data required for a mobile terminal to acquire the authentication from the wireless repeater when the mobile terminal requests the start of wireless communication with the wireless repeater using a first wireless communication path for short-range wireless communication.

Configuration Example in First Example Embodiment

First, a system configuration example of a wireless communication system in a first example embodiment according to the present invention is described with reference to FIG. 1. FIG. 1 is a system configuration diagram showing the system configuration example of the wireless communication system in the first example embodiment according to the present invention. FIG. 1 shows the system configuration example in which a mobile terminal 100 such as a smartphone as an example of a wireless communication terminal and a wireless repeater 200 such as a wireless router as an example of a wireless communication device are used, and the mobile terminal 100 and the wireless repeater 200 are connected by a first wireless communication path 20 for short-range wireless communication.

As shown in FIG. 1, in the wireless communication system in the first example embodiment, the mobile terminal 100 such as a smartphone as an example of a wireless communication terminal and the wireless repeater 200 as an example of a wireless communication device are connected by the first wireless communication path 20 for short-range wireless communication such as Bluetooth. In addition, the mobile terminal 100 after the connection to the wireless repeater 200 is configured to access an authentication server 300 installed in an internet 500 through a second wireless communication path 30 for wide-area wireless communication and to acquire authentication data for accessing the wireless repeater 200 using the first wireless communication path 20. In addition, the mobile terminal 100 and the wireless repeater 200 are each connected to a wireless LAN 400 through a third wireless communication path 40 for intra-area wireless communication, whereby the mobile terminal 100 and the wireless repeater 200 are connected to each other or with other wireless communication devices 600.

Here, the first wireless communication path 20 shown in FIG. 1 is a path for wireless communication using a standard for short-range wireless communication such as 'BLE' established in the Bluetooth version 4.0 standards, which has a slow communication speed but low power consumption. In addition, the second wireless communication path 30 shown in FIG. 1 is a path for Wide Area Network (WAN) wireless communication to connect to a base station or the like, using a standard for wide-area wireless communication such as 'Long Term Evolution (LTE)'. In addition, the third wireless communication path 40 shown in FIG. 1 is a path for wireless communication, using a communication standard for intra-area wireless communication (wireless LAN), which has a high communication speed to connect to a wireless Local Area Network (LAN) 400 but large power consumption.

Next, the mobile terminal 100 shown in FIG. 1 includes at least a management application 101, a first wireless communication unit 102, a second wireless communication unit 103, and a third wireless communication unit 104 in its inside.

The management application 101 has a function of implementing and managing a wireless communication service, and controls connection and communication in the first wireless communication unit 102, the second wireless communication unit 103, and the third wireless communication unit 104. The first wireless communication unit 102 is an interface for communication using the first wireless communication path 20 and has functions of both a master device and a slave device. The second wireless communication unit 103 is an interface for communication using the second wireless communication path 30 and has a function as a slave device. The third wireless communication unit 104 is an interface for communication using the third wireless communication path 40 and has a function as a slave device.

The wireless repeater 200 shown in FIG. 1 includes at least a control program 201, a first wireless communication unit 202, a second wireless communication unit 203, and a third wireless communication unit 204 in its inside, and holds control information 211 and authentication data 212 as first-wireless-communication data 210 for controlling the operation of the first wireless communication unit 202.

The control program 201 has a function of controlling the entire operation of its own wireless repeater 200 and controls connection and communication in the first wireless communication unit 202, the second wireless communication unit 203, and the third wireless communication unit 204. The first wireless communication unit 202 is an interface for communication using the first wireless communication path 20 and has a function of both a master device and a slave device. The second wireless communication unit 203 is an interface for communication using the second wireless communication path 30 and has a function as a slave device. The third wireless communication unit 204 is an interface for communication using the third wireless communication path 40 and has a function as a master device.

The control information 211 and the authentication data 212 held as the first-wireless-communication data 210 are data that is preset and preregistered as data for first wireless communication by an administrator of the wireless communication system or a user of its own wireless repeater 200.

In other words, the control information 211 holds in advance information for controlling the communication status of the first wireless communication unit 202 of its own wireless repeater 200, that is, the communication status of the first wireless communication path and is capable of changing the communication status of the first wireless communication unit 202 of its own wireless repeater 200, that is, the communication status of the first wireless communication path 20 by changing the settings. Note that, the settings of the control information 211 can be changed not only by the administrator of the wireless communication system or the user of its own wireless repeater 200 but also by the user of the mobile terminal 100 permitted to perform wireless communication with its own wireless repeater 200 using the first wireless communication path 20.

The authentication data 212 is data held in advance as information for authentication required to permit wireless communication with its own wireless repeater 200 using the first wireless communication path 20 (in addition, information for authentication required to enable the mobile terminal 100 using the first wireless communication path 20 to access the control information 211 that controls the communication status of the first wireless communication path 20 in its own wireless repeater 200). The wireless repeater 200 permits, when the mobile terminal 100 transmits authentication data same as the authentication data 212, the start of wireless communication with the mobile terminal 100 using the first wireless communication path 20. Then, the wireless repeater 200 permits, for example, the user of the mobile terminal 100 to access the control information 211 in its own wireless repeater 200 and to change, as necessary, the settings of the control information 211 to change the communication status of the first wireless communication path 20.

Note that, the first wireless communication unit 202 periodically transmits (outputs) first wireless communication scan data 21 to the outside at a predetermined cycle as data indicating the existence of its own wireless repeater 200. Here, the first wireless communication scan data 21 means the 'BLE' Advertising Packet specified in the Bluetooth standard.

Next, the authentication server 300 shown in FIG. 1 includes at least a second wireless communication unit 303 and a data base 310 having authentication data 312 for the wireless repeater 200 that is a connection target of the mobile terminal 100 using the first wireless communication path 20 in its inside.

The second wireless communication unit 303 is an interface for communication using the second wireless communication path 30 for wide-area wireless communication and has a function as a slave device. The authentication data 312 is data required for the mobile terminal 100 to start wireless communication with the wireless repeater 200 using the first wireless communication path 20, and is preset and preregistered as authentication data (that is, a startup key) for the wireless repeater 200 by the administrator of the wireless communication system or the administrator of the authentication server 300. In other words, the authentication data 312 preset and preregistered in the authentication server 300 is set to the same settings as the settings that have been set and registered by the administrator of the wireless repeater 200 or the administrator of the wireless communication system as the authentication data 212 for the first-wireless-communication data 210 in the wireless repeater 200. Then, when receiving an authentication data acquisition request transmitted from the mobile terminal 100 using the second wireless communication path 30, the authentication server 300 identifies the corresponding wireless repeater 200 based on the serial number attached to the authentication data acquisition request and retrieves the authentication data 312 for the identified wireless repeater 200 from the data base 310 to return it to the request-source mobile terminal 100.

In FIG. 1, as described above, the mobile terminal 100 and the authentication server 300 are capable of communicating with each other via the internet 500 using the second wireless communication path 30 from the second wireless communication unit 103 and the second wireless communication unit 303, respectively. In addition, as described above, the mobile terminal 100 and the wireless repeater 200 are capable of communicating with each other using the first wireless communication path 20 from the first wireless communication unit 102 and the first wireless communication unit 202, respectively. In addition, as described above, the mobile terminal 100 and the wireless repeater 200 are capable of communicating with each other or with other wireless communication devices 600 via the wireless LAN 400 using the third wireless communication path 40 from the third wireless communication unit 104 and the third wireless communication unit 204, respectively. In some cases, the mobile terminal 100 and the wireless repeater 200 are capable of communicating with each other via the internet 500 using the second wireless communication path 30 from the second wireless communication unit 103 and the second wireless communication unit 203, respectively.

Here, when the first wireless communication unit 102 acquires the first wireless communication scan data 21 output from the wireless repeater 200, the management application 101 of the mobile terminal 100 recognizes that the wireless repeater 200 is the connection target to which the connection is desired. As the result, the management application 101 of the mobile terminal 100 connects between its own mobile terminal 100 and the wireless repeater 200 using the first wireless communication path 20. Then, when the connection to the wireless repeater 200 is completed, the management application 101 accesses the authentication server 300 via the internet 500 using the second wireless communication path 30 to acquire, from the data base 310 of the authentication server 300, the authentication data 312 for the wireless repeater 200 that is the connection destination using the first wireless communication path 20. Note that, the management application 101 of the mobile terminal 100 transmits an authentication data acquisition request to which the serial number of the connection-destination wireless repeater 200 is attached to the authentication server 300, and thereby can acquire the authentication data for the wireless repeater 200 associated with the serial number.

The management application 101 of the mobile terminal 100 transmits the authentication request, to which the authentication data 312 for the wireless repeater 200 acquired from the authentication server 300 is attached, using the first wireless communication path 20 to the connection-destination wireless repeater 200. Note that, when transmitting the authentication data 312 for the wireless repeater 200 to the connection-destination wireless repeater 200, the management application 101 of the mobile terminal 100 generates a random number for authentication as a one-time password, uses the generated random number for authentication to encrypt the authentication data 312, and generates hash data in order to prevent unauthorized eavesdropping by a third person. Then, it is desired for the management application 101 to create an authentication request to which the generated hash data is attached instead of the authentication data 312 to transmit it to the connection-destination wireless repeater 200.

When receiving the authentication data 312 (or hash data) attached to the authentication request transmitted from the mobile terminal 100, the control program 201 of the wireless repeater 200 compares it with the authentication data 212 of the first-wireless-communication data 210 held in its own wireless repeater 200 as the authentication data for its own wireless repeater 200 (or hash data converted from the authentication data 212 with the random number for authentication) to determine whether to authenticate that the transmission-source mobile terminal 100 is a legitimate mobile terminal 100 whose wireless communication is to be permissible. Then, the control program 201 creates, as an authentication result, a determination result indicating whether the mobile terminal 100 has been authenticated as the legitimate mobile terminal 100 and returns it as authentication determination information to the request-source mobile terminal 100. Here, when the authentication result is that the mobile terminal 100 has been authenticated as the legitimate mobile terminal 100, the control program 201 of the wireless repeater 200 permits the mobile terminal 100 to perform wireless communication with its own wireless repeater 200 and also permits it to access, for example, the control information 211 in its own wireless repeater 200.

When checking the authentication determination information transmitted from the wireless repeater 200, the management application 101 of the mobile terminal 100 determines, when the information indicates the authentication, that the wireless communication with the wireless repeater 200 using the first wireless communication path 20 has been permitted and that the access to the control information 211 in the wireless repeater 200 has been also permitted. Then, when the access to the control information 211 of the first-wireless-communication data 210 is permitted, the management application 101 of the mobile terminal 100 accesses the control information 211 in the wireless repeater 200 and changes it to desired settings to change the communication status with the wireless repeater 200 using the first wireless communication path 20 to a desired status.

Operation Example in First Example Embodiment

Figure 2B:
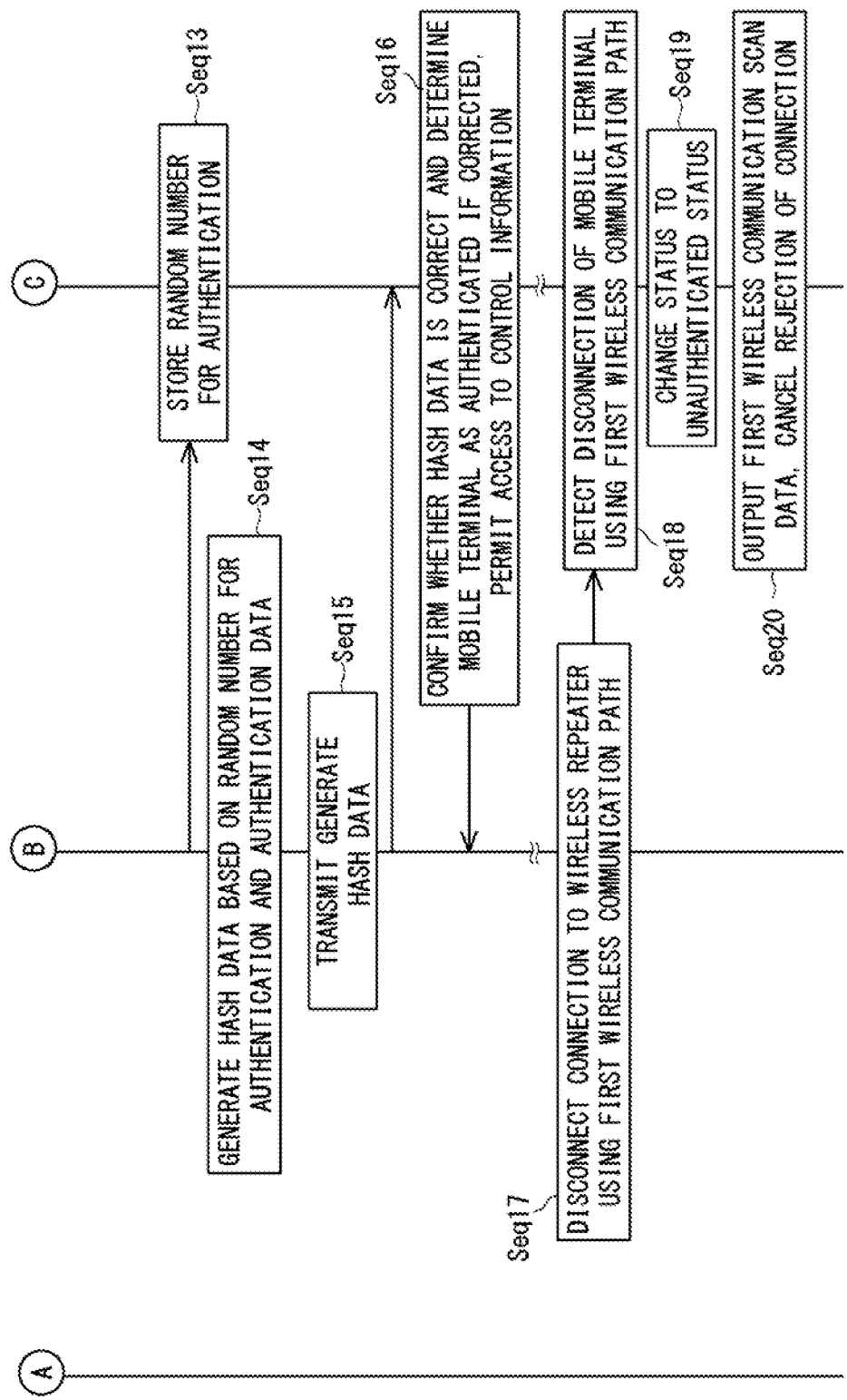

Next, an example of the operation of the wireless communication system shown in FIG. 1 in the first example embodiment according to the present invention is described in detail with reference to a sequence chart of FIGS. 2A and 2B. FIGS. 2A and 2B are a sequence chart for explaining an example of the operation of the wireless communication system shown in FIG. 1 and shows an example of exchanging control information between the mobile terminal 100, the wireless repeater 200, and the authentication server 300 shown in FIG. 1.

In the sequence chart of FIGS. 2A and 2B, firstly, when the wireless repeater 200 is installed in the wireless communication system, the administrator of the wireless communication system registers the use of the wireless repeater 200 in the authentication server 300 (step of sequence Seq1), and presets and preregisters the authentication data 312 for the wireless repeater 200 in the data base 310 of the authentication server 300 in association with the serial number (production number) of the wireless repeater 200 (step of sequence Seq2). On the other hand, the wireless repeater 200 presets and preregisters, by the operation of the control program 201, the control information 211 for controlling wireless communication using the first wireless communication path 20 as the first-wireless-communication data 210 in its own wireless repeater 200 and the authentication data 212 for permitting wireless communication with its own wireless repeater 200, although this is not shown in the sequence chart of FIGS. 2A and 2B. Here, the authentication data 212 set and registered in the wireless repeater 200 is the same setting as the authentication data 312 set and registered in the authentication server 300.

Then, the wireless repeater 200 repeats, by the operation of the control program 201, the operation of periodically outputting the first wireless communication scan data 21 indicating the existence of its own wireless repeater 200 (for example, the Advertising Packet specified in the 'BLE' standard) from the first wireless communication unit 202 at a predetermined cycle (step of sequence Seq3).

Note that, when receiving a connection request transmitted using the first wireless communication path 20 from the mobile terminal 100 or the like, the wireless repeater 200 performs, by the operation of the control program 201, the operation of permitting connection using the first wireless communication path 20 for all connection requests from the mobile terminal 100 or the like without pairing operation and any manual operation. However, after the connection, the wireless repeater 200 permits the wireless communication of the connected mobile terminal 100 or the like with its own wireless repeater 200 (in addition, also permits the access of, for example, the connected mobile terminal 100 or the like to the control information 211 in its own wireless repeater 200) only when the authentication using the preset and preregistered authentication data 212 is obtained, and rejects the wireless communication of the connected mobile terminal 100 with its own wireless repeater 200 when the authentication is not obtained.

When the user of the mobile terminal 100 activates the management application 101 of its own mobile terminal 100 in the situation where the periodic output of the first wireless communication scan data 21 in the step of sequence Seq3 is being performed, the management application 101 first performs a search operation in the first wireless communication unit 102. In other words, the management application 101 checks whether the first wireless communication scan data 21 output from the wireless repeater 200 has been detected in the search operation (step of sequence Seq4). Then, when first wireless communication scan data 21 has been detected in the first wireless communication unit 102, the management application 101 of the mobile terminal 100 analyzes the content of the first wireless communication scan data to determine whether the first wireless communication scan data 21 has been output from the connection-target wireless repeater 200 to which the connection is desired.

As the determination result, the management application 101 of the mobile terminal 100 identifies that the first wireless communication scan data 21 has been output from the connection-target wireless repeater 200 (step of sequence Seq5), and then transmits a connection request to the wireless repeater 200 from the mobile terminal 100 using the first wireless communication path 20 (step of sequence Seq6).

When receiving the connection request using the first wireless communication path 20 from the mobile terminal 100, the control program 201 of the wireless repeater 200 stops the output operation of the first wireless communication scan data 21 that has been periodically output until that point and sets the status in such a manner as not to accept connection requests from other communication terminals (step of sequence Seq7). Thereafter, the control program 201 of the wireless repeater 200 returns an indication of permission of connection for all connection requests without performing pairing operation requiring manual operation in response to the connection request from the mobile terminal 100 as described above (step of sequence Seq8). As the result, the management application 101 of the mobile terminal 100 receives the connection permission from the wireless repeater 200 and sets the status in such a manner that the connection to the wireless repeater 200 using the first wireless communication path 20 has been completed (step of sequence Seq9).

After the connection to the wireless repeater 200 is completed, the management application 101 of the mobile terminal 100 retrieves the serial number that uniquely identifies the connected wireless repeater 200. Then, the management application 101 transmits an acquisition request for authentication data for the wireless repeater 200, to which the serial number identifying the wireless repeater 200 is attached, to the authentication server 300 via the internet 500 using the second wireless communication path 30 (step of sequence Seq10).

When receiving the acquisition request for the authentication data from the mobile terminal 100 using the second wireless communication path 30, the authentication server 300 refers to the data base 310 to search for the authentication data 312 for the wireless repeater 200 associated with the serial number based on the serial number of the wireless repeater 200 attached to the acquisition request. In addition, the authentication server 300 returns the authentication data 312 for the wireless repeater 200 that has been searched for to the request-source mobile terminal 100 using the second wireless communication path 30 (step of sequence Seq11).

When acquiring the authentication data 312 for the wireless repeater 200 returned from the authentication server 300, the management application 101 of the mobile terminal 100 first generates a random number about data for authentication as a one-time password (step of sequence Seq12). Then, the management application 101 of the mobile terminal 100 transmits the generated random number about the data for authentication to the connection-destination wireless repeater 200 using the first wireless communication path 20. When receiving the random number about the data for authentication transmitted from the mobile terminal 100, the control program 201 of the wireless repeater 200 stores the received random number about the data for authentication in a memory to save it temporarily (step of sequence Seq13).

On the other hand, the management application 101 of the mobile terminal 100 generates hash data based on the random number about data for authentication generated in the step of sequence Seq12 and the authentication data 312 for the wireless repeater 200 acquired from the authentication server 300 (step of sequence Seq14). Then, the management application 101 transmits an authentication request to which the generated hash data is attached to the wireless repeater 200 using the first wireless communication path 20 (step of sequence Seq15).

When receiving the authentication request transmitted from the mobile terminal 100, the control program 201 of the wireless repeater 200 first retrieves the authentication data 212 for its own wireless repeater 200 registered in the first-wireless-communication data 210 and generates hash data using the random number about the data for authentication temporarily saved in the memory. Thereafter, the control program 201 compares the generated hash data with the hash data attached to the authentication request transmitted from the mobile terminal 100.

Then, the control program 201 of the wireless repeater 200 confirms whether the hash data attached to the authentication request received from the mobile terminal 100 is correct (that is, whether the authentication data 312 transmitted from the mobile terminal 100 matches the authentication data 212 for its own wireless repeater 200) as the comparison result. When determining that the hash data from the mobile terminal 100 is correct, the control program 201 determines that the mobile terminal 100 that has transmitted the authentication request to which the hash data is attached has been authenticated and sets the status in such a manner that wireless communication with the mobile terminal 100 is permitted. Then, the control program 201 also permits the mobile terminal 100 to access the control information 211 stored in the first-wireless-communication data 210 in its own wireless repeater 200 and returns an indication of authenticated to the mobile terminal 100 that is the transmission source of the authentication request (step of sequence Seq16).

On the other hand, when receiving return data of the indication of authenticated from the wireless repeater 200, the management application 101 of the mobile terminal 100 starts wireless communication with the wireless repeater 200 using the first wireless communication path 20, although this is not shown in the sequence chart of FIGS. 2A and 2B. In addition, since the management application 101 of the mobile terminal 100 is in a status for being permitted to access the control information 211 stored in the first-wireless-communication data 210 in the wireless repeater 200, the management application 101 accesses the control information 211 and checks the content of the control information 211 to change it to a desired status or to transmit/receive arbitrary information to/from the wireless repeater 200.

Thereafter, when completing the change of the control information 211 stored in the first-wireless-communication data 210 in the wireless repeater 200 or transmission/reception of arbitrary information, the management application 101 of the mobile terminal 100 disconnects the connection to the wireless repeater 200 using the first wireless communication path 20 as shown in FIG. 2B (step of sequence Seq17).

As the result, the control program 201 of the wireless repeater 200 detects that the mobile terminal 100 has disconnected the connection using the first wireless communication path 20 (step of sequence Seq18), and changes the status of the mobile terminal 100 to an unauthenticated status from an authenticated status. In addition, the control program 201 sets the wireless communication with the mobile terminal 100 to a non-permission status and returns the access to the control information 211 stored in the first-wireless-communication data 210 from the mobile terminal 100 to a non-permission status (step of sequence Seq19). Thereafter, the control program 201 of the wireless repeater 200 cancels the status of rejecting connection requests from other communication terminals other than the mobile terminal 100, resumes operation of periodically outputting the first wireless communication scan data 21 indicating the existence of its own wireless repeater 200 from the first wireless communication unit 202 at a predetermined cycle, and returns to the status of accepting connection requests from all communication terminals including the mobile terminal 100 (step of sequence Seq20).

By performing the above operation, it is unnecessary for the users of the mobile terminal 100 and the wireless repeater 200 to perform any manual operation for pairing when the user of the mobile terminal 100 tries to connect to the wireless repeater 200 to set and change the communication status of the first wireless communication path 20 to a desired status, and it is possible to automatically and quickly perform connection between the mobile terminal 100 and the wireless repeater 200.

Then, the mobile terminal 100 connected to the wireless repeater 200 transmits an authentication request, to which the authentication data 312 for the wireless repeater 200 (or hash data encrypted from the authentication data 312) acquired from the authentication server 300 is attached, to the wireless repeater 200. When receiving the authentication data 312 (or the hash data encrypted from the authentication data 312) attached to the authentication request, the wireless repeater 200 compares it with the authentication data 212 (or the hash data encrypted from the authentication data 212) preregistered in its own wireless repeater 200. Then, only when authentication is acquired as the comparison result of both two pieces of authentication data, the wireless repeater 200 permits wireless communication with the connected mobile terminal 100 and also permits the access to the control information 211 in its own wireless repeater 200 from the mobile terminal 100, and thereby permitting to change the settings of the control information 211 to the settings that the mobile terminal 100 desires.

Figure 3:
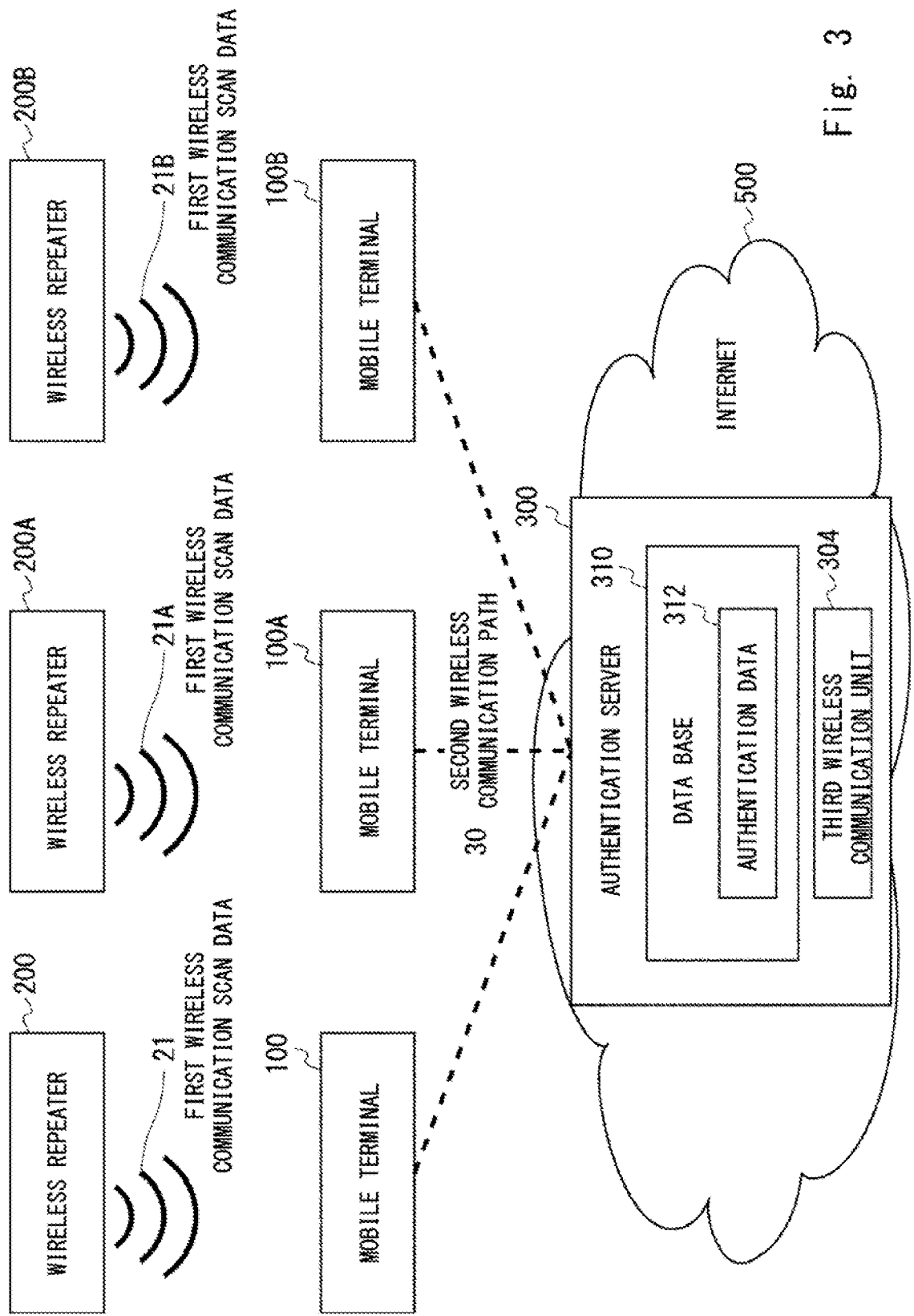
FIG. 3 is a system configuration diagram showing a system configuration example of the wireless communication system in the first example embodiment according to the present invention, and the system configuration diagram is different from FIG. 1.

Note that, as shown in the system configuration diagram of FIG. 3, if there are multiple mobile terminals (FIG. 3 shows three mobile terminals of a mobile terminal 100, a mobile terminal 100A, and a mobile terminal 100B) and multiple wireless repeaters (FIG. 3 shows three mobile terminals of a wireless repeater 200, a wireless repeater 200A, and a wireless repeater 200B), one authentication server 300 can manage them. FIG. 3 is a system configuration diagram showing a system configuration example of the wireless communication system in the first example embodiment according to the present invention, which is different from FIG. 1, and shows a case where the multiple mobile terminals 100, 100A, and 100B and the multiple wireless repeaters 200, 200A, and 200B exist with respect to one authentication server 300. Note that, in FIG. 3, the illustration about connection paths for connection via the wireless LAN 400 using the third wireless communication path 40 shown in FIG. 1 is omitted.

In FIG. 3, the multiple mobile terminals 100, 100A, and 100B and the multiple wireless repeaters 200, 200A, and 200B are each constituted by exactly the same elements as those of the mobile terminal 100 and the wireless repeater 200 shown in FIG. 1. Then, the multiple wireless repeaters 200, 200A, and 200B periodically output first wireless communication scan data 21, first wireless communication scan data 21A, and first wireless communication scan data 21B, respectively, indicating the existence of their own wireless repeaters, when all the mobile terminals are in an unconnected status.

Thus, the multiple mobile terminals 100, 100A, and 100B detect the first wireless communication scan data 21, the first wireless communication scan data 21A, and the first wireless communication scan data 21B output from the multiple wireless repeaters 200, 200A, and 200B, respectively, and can connect to the desired wireless repeaters 200, 200A, and 200B, respectively when recognizing them as the desired connection destinations.

Here, if the wireless communication system is constituted by the multiple wireless repeaters 200, 200A, and 200B shown in FIG. 3, it is possible to set and register, as the authentication data 312 of the authentication server 300, a plurality of pieces of authentication data required to communicate with the multiple wireless repeaters 200, 200A, and 200B using the first wireless communication path 20 in association with their serial numbers (production numbers).

Thus, the multiple mobile terminals 100, 100A, and 100B connected to the connection-target wireless repeaters 200, 200A, and 200B, respectively, access the authentication server 300 using the second wireless communication path 30, and can acquire authentication data for the respective connected wireless repeaters from the authentication server 300. Then, the multiple mobile terminals 100, 100A, and 100B request authentication to the respective connected wireless repeaters using the respective pieces of authentication data acquired from the authentication server 300, and can acquire permission of the access to the control information set to the respective wireless repeaters as information indicating a communication status of the first wireless communication path 20.

In addition, if the administrator of the wireless communication system determines that, for example, the mobile terminal 100 among the multiple mobile terminals 100, 100A, and 100B shown in FIG. 3 is a mobile terminal used by a third person that is not a legitimate user, and desires to set it to a status of being inaccessible to any control information in the multiple wireless repeaters 200, 200A, and 200B, the settings of the authentication server 300 are changed to the settings for prohibiting any access to its own authentication server 300 from the mobile terminal 100. By performing such settings, the user of the mobile terminal 100 cannot access control information in any of the multiple wireless repeaters 200, 200A, and 200B.

In addition, if it is desired that, for example, the wireless repeater 200 among the multiple wireless repeaters 200, 200A, and 200B is set to a status for prohibiting any access to the control information 211 in their own wireless repeaters 200 from the multiple mobile terminals 100, 100A, and 100B, the settings of the authentication server 300 are changed to delete the authentication data 312 for the wireless repeater 200 from the authentication data for the wireless repeaters 200, 200A, and 200B stored in the data base 310 or to set a status for prohibiting the access. By performing such settings, any of the multiple mobile terminals 100, 100A, and 100B cannot access the control information 211 in the wireless repeater 200.

(Effects of First Example Embodiment)

As described above in detail, the first example embodiment according to the present invention has the following effects.

The users of the mobile terminal 100 and the wireless repeater 200 can automatically and quickly connect between the mobile terminal 100 and the wireless repeater 200, using the first wireless communication path 20 without performing any manual operation for pairing.

In addition, the mobile terminal 100 can perform wireless communication with the wireless repeater 200 only when the authentication data 312 for the wireless repeater 200 can be acquired from the authentication server 300 using the second wireless communication path 30. For example, since the mobile terminal 100 can access the control information 211 stored in the first-wireless-communication data 210 in the wireless repeater 200 as information indicating the communication status of the first wireless communication path 20, it is possible to restrict a communication terminal of a third person who does not have a means for accessing the authentication server 300 from improperly accessing the control information 211 in the wireless repeater 200.

Configuration Example in Second Example Embodiment

Figure 4:
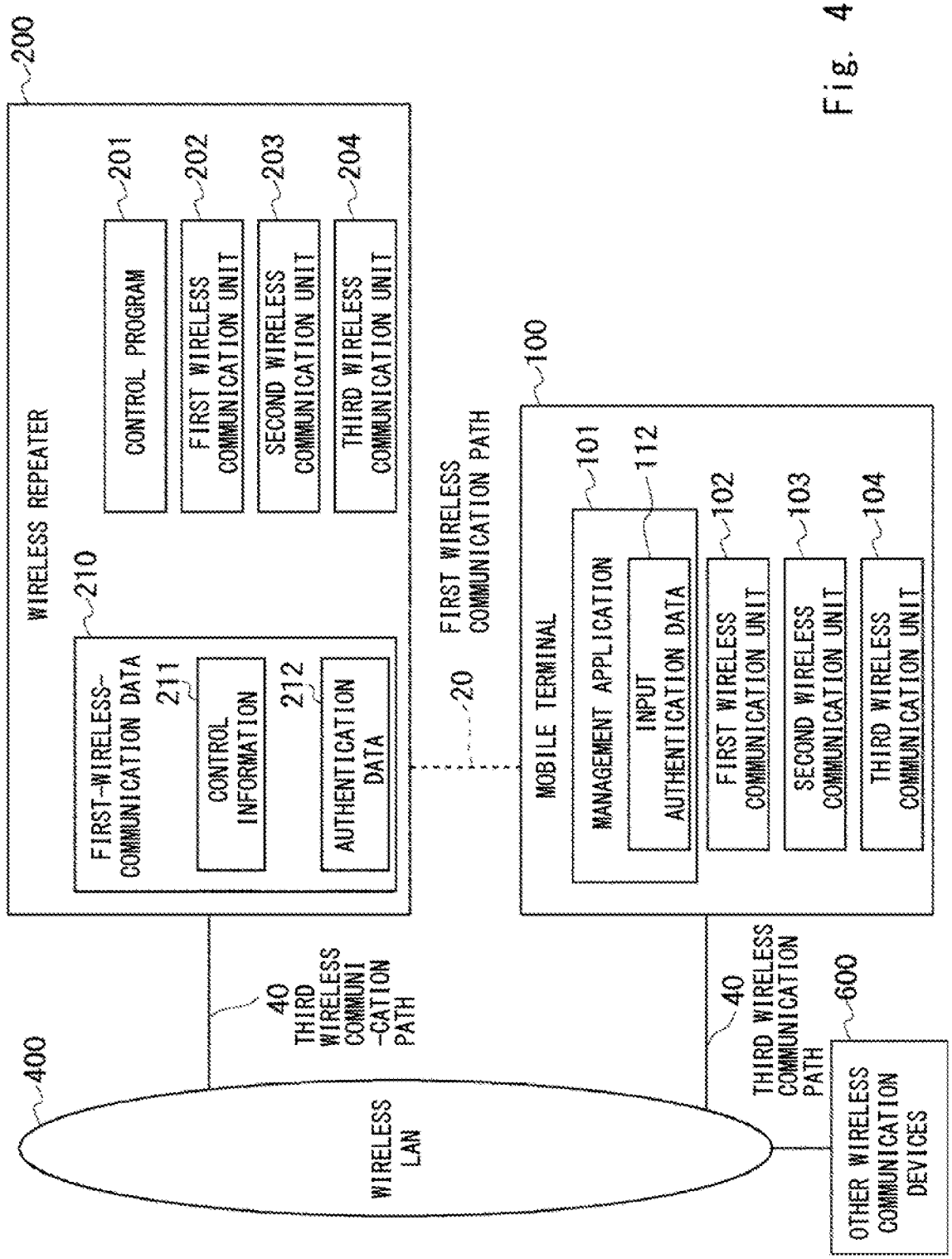
FIG. 4 is a system configuration diagram showing a system configuration example of a wireless communication system in a second example embodiment according to the present invention.

Next, a system configuration example of a wireless communication system in a second example embodiment according to the present invention is described with reference to FIG. 4. FIG. 4 is a system configuration diagram showing the system configuration example of a wireless communication system in the second example embodiment according to the present invention, and shows a case where the authentication server 300 is not included, unlike the first example embodiment shown in FIG. 1.

The wireless communication system in the second example embodiment shown in FIG. 4 does not include the authentication server 300 as described above, but instead holds in advance authentication data for a connection-target wireless repeater 200 in a mobile terminal 100 as input authentication data 112. In other words, FIG. 4 shows a case where, if the user of the mobile terminal 100 desires to access control information 211 in the wireless repeater 200 to change setting information about connection, the user of the mobile terminal 100 inputs the authentication data for the wireless repeater 200 in advance and holds it as the input authentication data 112 in a form accessible from a management application 101 of its own mobile terminal 100. Note that the input authentication data 112 is set to the same settings as the settings that have been set and registered by the user of the wireless repeater 200 or the administrator of the wireless communication system as authentication data 212 of first-wireless-communication data 210 in the wireless repeater 200.

In addition, FIG. 2 shows that the mobile terminal 100 and the wireless repeater 200 include a second wireless communication unit 103 and a second wireless communication unit 203, respectively, as a wireless communication unit that accesses the authentication server 300 via the internet 500 using a second wireless communication path 30. In the second example embodiment, the authentication server 300 is not included, unlike the case in FIG. 1, and the second wireless communication unit 103 of the mobile terminal 100, the second wireless communication unit 203 of the wireless repeater 200 may also be deleted.

Operation Example in Second Example Embodiment

Figure 5:
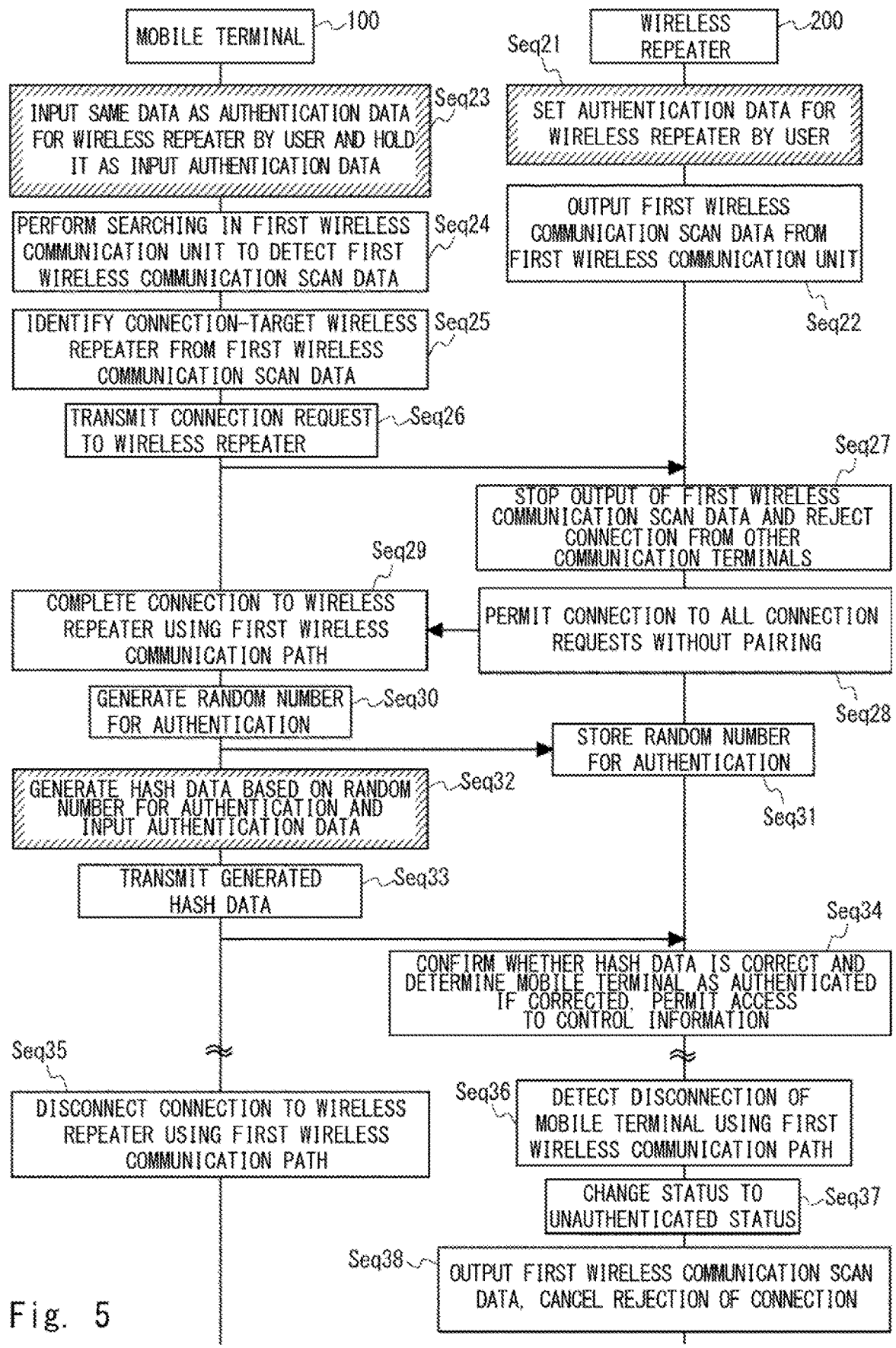
FIG. 5 is a sequence chart for explaining an example of the operation of the wireless communication system shown in FIG. 4.

Next, an example of the operation of the wireless communication system in the second example embodiment according to the present invention shown in FIG. 4 is described with reference to a sequence chart of FIG. 5, focusing the difference from the sequence chart of FIGS. 2A and 2B described as the first example embodiment. FIG. 5 is a sequence chart for explaining an example of the operation of the wireless communication system shown in FIG. 4, and shows an example of exchanging control information between the mobile terminal 100 and the wireless repeater 200 shown in FIG. 4.

Here, in the sequence chart of FIG. 5 for the system configuration not including the authentication server 300, the following six points from 1) to 6) are different from the sequence chart shown in FIGS. 2A and 2B as the first example embodiment, but the operation other than the six points is completely the same operation as that in the sequence chart shown in FIGS. 2A and 2B, and the duplicated description here is omitted.

For clarification, the same sequences as those in the sequence chart shown in FIGS. 2A and 2B are the following a) and b) and are shown in FIG. 5 without hatching.

a) Seq24 to Seq26, Seq29, Seq30, Seq32, Seq33, and Seq35 of the sequences for the mobile terminal 100 in FIG. 5 are the same operation as Seq4 to Seq6, Seq9, Seq12, Seq14, Seq15, and Seq17, respectively of the sequences in FIGS. 2A and 2B.

b) Seq22, Seq27, Seq28, Seq31, Seq34, and Seq36 to Seq38 of the sequences for the wireless repeater 200 in FIG. 5 are the same operation as Seq3, Seq7, Seq8, Seq13, Seq16, and Seq18 to Seq20, respectively of the sequences in FIGS. 2A and 2B.

In addition, the step numbers of a sequence that differs from the operation in the sequence chart shown in FIGS. 2A and 2B are as follows. Note that FIG. 5 shows steps of a sequence different from FIGS. 2A and 2B with hatching.

1) Deletion of the operation of registering the use of the wireless repeater 200 and of setting and registering the authentication data 312 in the steps of sequence Seq1 and Seq2 of the authentication server 300 of FIG. 2A 2) Addition of the operation of setting the authentication data 212 for the wireless repeater 200 in the step of sequence Seq21 of the wireless repeater 200 in FIG. 5

3) Addition of the operation of inputting and holding the input authentication data 112 in the step of sequence Seq23 of the mobile terminal 100 in FIG. 5

Figure 6:
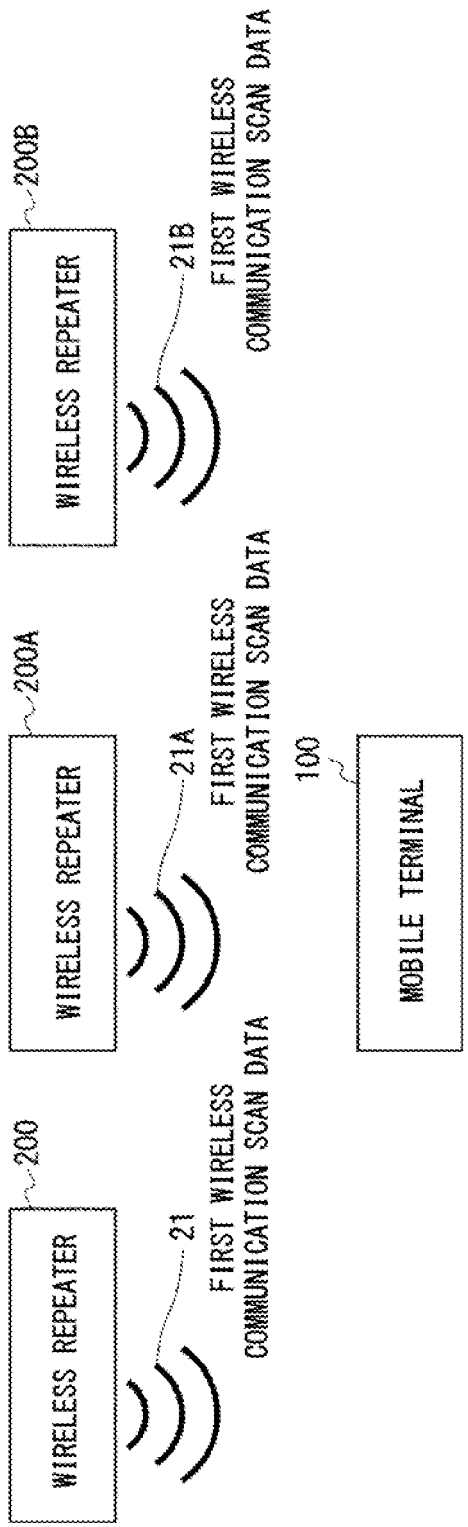
FIG. 6 is a system configuration diagram showing a system configuration example of the wireless communication system in the second example embodiment according to the present invention, and the system configuration diagram is different from FIG. 4.

4) Deletion of the operation of requesting the acquisition of the authentication data 312 to the authentication server 300 in the step of sequence Seq10 of the mobile terminal 100 in FIG. 2A 5) Deletion of the operation of returning the authentication data 312 in the step of sequence Seq11 of the authentication server 300 in FIG. 2A 6) Change to the operation of using the input authentication data 112 instead of the authentication data 312 from the authentication server 300 in the step of sequence Seq14 of the mobile terminal 100 in FIG. 2B to generate hash data in the step of sequence Seq32 of the mobile terminal 100 in FIG. 5

In the sequence chart of FIGS. 2A and 2B where the authentication server 300 is included, as described in the item 1), the operation of registering the authentication data 312 for the wireless repeater 200 is performed in steps of sequence Seq1 and Seq2 of the authentication server 300. However, in FIG. 5 for the wireless communication system not including the authentication server 300, as described in the item 3), the user of the mobile terminal 100 performs, instead of the registration operation to the authentication server 300, operation of inputting in advance the same data as the authentication data 212 for the connection-target wireless repeater 200 and holding it as the input authentication data 112 in its own mobile terminal 100 in the step of sequence Seq23 of the mobile terminal 100.

Note that, as described in the item 2, in the step of sequence Seq21 of the wireless repeater 200 in FIG. 5, the user of its own wireless repeater 200 or the administrator of the wireless communication system performs the operation of presetting and preregistering the authentication data 212 for permitting connection to its own wireless repeater 200. However, the sequence regarding the authentication data 212 for its own wireless repeater 200 is omitted from the sequence chart of FIGS. 2A and 2B because of complication of explanation, but the authentication data 212 is preset and preregistered in its own wireless repeater 200 in the wireless communication system including the authentication server 300 in FIG. 1 as described above in the first example embodiment, as a matter of course.

In addition, in the sequence chart of FIGS. 2A and 2B where the authentication server 300 is included, as described in the items 4) and 5), the operation of transmitting an acquisition request for authentication data to the authentication server 300 is performed in the step of sequence Seq10 of the mobile terminal 100, and the operation of returning the authentication data for the wireless repeater 200 to the request source from the authentication server 300 having received the request is performed in the step of sequence Seq11.

However, in the sequence chart of FIG. 5 for the wireless communication system not including the authentication server 300, as described in the item 3), the mobile terminal 100 holds in advance the authentication data for the connection-target wireless repeater 200 as the input authentication data 112 in the step of sequence Seq23. Then, in the step of sequence Seq32 of the mobile terminal 100 in the step of sequence chart of FIG. 5, as described in the item 6), the mobile terminal 100 performs, instead of the operation of acquiring the authentication data 312 from the authentication server 300, the operation of generating hash data using the input authentication data 112 held in advance in the step of sequence Seq23 as the authentication data for the wireless repeater 200.

As described above, even if the authentication server 300 is not included, the authentication data for the connection-target wireless repeater 200 is preset and preregistered in the mobile terminal 100 as the input authentication data 112, and the mobile terminal 100 is determined as being authenticated by the connection-destination wireless repeater 200 in the step of sequence Seq34 of FIG. 5 and is set to a status for being permitted to access the control information 211 set in the wireless repeater 200. Thus, the user of the mobile terminal 100 can change, if necessary, the settings of the control information 211 in the wireless repeater 200 to change the communication status of the first wireless communication path 20 to a desired status.

Note that, as shown in the system configuration diagram of FIG. 6, even if there are one mobile terminal 100 and multiple wireless repeaters (FIG. 6 shows a case where there mobile terminals of a wireless repeater 200, a wireless repeater 200A, and a wireless repeater 200B), the one mobile terminal 100 is capable of connecting to, among the wireless repeater 200, the wireless repeater 200A, and the wireless repeater 200B, an arbitrary wireless repeater to which the mobile terminal 100 desires to connect to access the control information in the wireless repeater. FIG. 6 is a system configuration diagram showing a system configuration example of the wireless communication system in the second example embodiment according to the present invention, which is different from FIG. 4, and shows a case where there are one mobile terminal and multiple wireless repeaters. Note that, in FIG. 6, the illustration about connection paths for connection via the wireless LAN 400 using the third wireless communication path 40 shown in FIG. 4 is omitted.

In FIG. 6, the one mobile terminal 100 and the multiple wireless repeaters 200, 200A, and 200B are each constituted by exactly the same elements as those of the mobile terminal 100 and the wireless repeater 200 shown in FIG. 4. Then, the multiple wireless repeaters 200, 200A, and 200B periodically output first wireless communication scan data 21, first wireless communication scan data 21A, and first wireless communication scan data 21B, respectively, indicating the existence of their own wireless repeaters, when the mobile terminal is in an unconnected status.

If the wireless communication system is constituted by the multiple wireless repeaters 200, 200A, and 200B shown in FIG. 6, it is possible to input and hold in advance, as the input authentication data 112 of the mobile terminal 100, a plurality of pieces of authentication data required to communicate with the multiple wireless repeaters 200, 200A, and 200B using the first wireless communication path 20. Thus, when detecting the first wireless communication scan data 21, the first wireless communication scan data 21A, and the first wireless communication scan data 21B output from the multiple wireless repeaters 200, 200A, and 200B, respectively, and recognizing them as the desired connection destinations, the one mobile terminal 100 can connect to, among the desired multiple wireless repeaters 200, 200A, and 200B, any desired wireless repeater to access the control information held in the wireless repeater.

In other words, the mobile terminal 100 can retrieve, among a plurality of pieces of authentication data required to connect to the multiple wireless repeaters 200, 200A, and 200B held in its own mobile terminal 100 as the input authentication data 112, the authentication data for any of the desired wireless repeater 200, 200A, and 200B, and request authentication to a connection-target wireless repeater, for example, the wireless repeater 200. Then, when acquiring the authentication, the mobile terminal 100 is permitted to access the control information 211 held in the wireless repeater 200, and can change the settings of the control information 211 to change the communication status of the first wireless communication path 20 to an arbitrary status.

As described above as the first and second example embodiments, the wireless communication system according to the present invention has a characteristic following system configuration.

The wireless repeater 200 holds at least control information 211 for controlling a communication status of the first wireless communication path 20 for short-range wireless communication in compliance with the Bluetooth standard (for example, Bluetooth version 4.0 'BLE') or the like, and authentication data 212 required to permit wireless communication with its own wireless repeater 200 using the first wireless communication path 20.

Then, when receiving a connection request using the first wireless communication path 20 from the mobile terminal 100, the wireless repeater 200 automatically permits connection without manual operation for pairing.

Then, when receiving an authentication request to which authentication data is attached for requesting a start of wireless communication with its own wireless repeater 200 using the first wireless communication path 20 from the mobile terminal 100 that has been in a status connected, the wireless repeater 200 determines whether to authenticate the authentication-request-source mobile terminal 100, based on a result of comparing the authentication data attached to the authentication request from the mobile terminal 100 with the authentication data 212 held in its own wireless repeater 200.

Then, when the authentication-request-source mobile terminal 100 has been authenticated, the wireless repeater 200 sets a status in such a manner as to perform wireless communication with the mobile terminal 100 using the first wireless communication path 20.

Here, when performing the operation of transmitting the authentication request to the wireless repeater 200, the mobile terminal 100 may firstly generate a random number for authentication, generate hash data based on the generated random number for authentication and the authentication data to be attached to the authentication request, and transmit the authentication request to which the hash data is attached instead of the authentication data as the authentication request with the authentication data to the wireless repeater.

Then, in that case, the wireless repeater 200 acquires the random number for authentication generated by the mobile terminal 100, and generates hash data based on the acquired random number for authentication and the authentication data 212 held in its own wireless repeater 200.

Then, when receiving the authentication request to which the hash data is attached as the authentication request with the authentication data from the mobile terminal 100, the wireless repeater 200 determines whether to authenticate the authentication-request-source mobile terminal 100, based on a result of comparing the hash data attached to the authentication request from the mobile terminal 100 with the hash data generated by its own wireless repeater 200, instead of comparing the authentication data attached to the authentication request from the mobile terminal 100 with the authentication data held in its own wireless repeater 200.

Note that, when the authentication-request-source mobile terminal 100 has been authenticated, the wireless repeater 200 also permits the mobile terminal 100 to access the control information 211 held in its own wireless repeater 200, and the mobile terminal 100 can access, when the mobile terminal 100 has been authenticated, the control information 211 held in the wireless repeater 200 using the first wireless communication path 20 and change settings of the control information 211 in such a manner to change a communication status of the first wireless communication path 20 to an arbitrary desired status.

In addition, the mobile terminal 100 can acquire either authentication data input in advance by a user of its own mobile terminal 100 for the wireless repeater 200 to which the user desires to connect, the authentication data being held in its own mobile terminal 100 as the input authentication data 112, or authentication data preset and preregistered as authentication data 312 for the wireless repeater 200 in the authentication server 300 installed in the internet 500, and use the authentication data to be attached to the authentication request.

The mobile terminal 100 further includes the second wireless communication unit 103 that performs wireless communication with the authentication server 300 as a wide-area wireless communication function (wireless communication function in compliance with the LTE standard or the like), and uses, when accessing the authentication server 300 installed in the internet 500 to acquire the authentication data for the wireless repeater 200, the second wireless communication path 30 for wide-area wireless communication instead of the first wireless communication path 20 to access the authentication server 300.

In addition, as long as none of the mobile terminals 100 are unconnected to its own wireless repeater 200, the wireless repeater 200 periodically outputs first wireless communication scan data 21 indicating existence of its own wireless repeater 200 at a predetermined cycle using the first wireless communication path 20, or when the mobile terminal 100 has been in a status connected to its own wireless repeater 200, the wireless repeater 200 stops outputting the first wireless communication scan data 21 and rejects further connection from any mobile terminals other than the connected mobile terminal 100.

Furthermore, when detecting that the mobile terminal 100 that has been authenticated has disconnected wireless communication using the first wireless communication path 20, the wireless repeater 200 returns a status of the mobile terminal to an unauthenticated status from an authenticated status and resumes operation of periodically outputting the first wireless communication scan data 21 that has been stopped.

The configuration in preferred example embodiments of the present invention has been described above. However, the example embodiments are merely examples of the present invention and do not limit the present invention at all. It will be readily understood by those skilled in the art that various modifications and changes can be made according to specific applications without departing from the gist of the present invention.

In the above example embodiments, the present invention has been described as a hardware configuration, but the present invention is not limited thereto. The present invention can be achieved by a central processing unit (CPU) executing a program. The program can be stored by various types of non-transitory computer-readable media and provided to a computer. Non-transitory computer-readable media include any type of tangible storage media. Examples of non-transitory computer-readable media include magnetic storage media (such as flexible disks, magnetic tapes, and hard disk drives), optical magnetic storage media (such as magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, and Random Access Memory (RAM)). The program may be provided to a computer using any type of transitory computer-readable media. Examples of transitory computer-readable media include electric signals, optical signals, and electromagnetic waves. Transitory computer readable media can provide the program to a computer via a wired communication line (such as electric wires, and optical fibers) or a wireless communication line.

This application is based upon and claims the benefit of priority of Japanese Patent Application No. 2019-153537 filed on Aug. 26, 2019, the disclosure of which is incorporated herein in its entirety by reference.

INDUSTRIAL APPLICABILITY

The present invention can be used in various types of communication networks.

REFERENCE SIGNS LIST

20 FIRST WIRELESS COMMUNICATION PATH
21 FIRST WIRELESS COMMUNICATION SCAN DATA
21A FIRST WIRELESS COMMUNICATION SCAN DATA
21B FIRST WIRELESS COMMUNICATION SCAN DATA
30 SECOND WIRELESS COMMUNICATION PATH
40 THIRD WIRELESS COMMUNICATION PATH
100 MOBILE TERMINAL
100A MOBILE TERMINAL
100B MOBILE TERMINAL
101 MANAGEMENT APPLICATION
102 FIRST WIRELESS COMMUNICATION UNIT
103 SECOND WIRELESS COMMUNICATION UNIT
104 THIRD WIRELESS COMMUNICATION UNIT
112 INPUT AUTHENTICATION DATA
200 WIRELESS REPEATER
200A WIRELESS REPEATER
200B WIRELESS REPEATER
201 CONTROL PROGRAM
202 FIRST WIRELESS COMMUNICATION UNIT
203 SECOND WIRELESS COMMUNICATION UNIT
204 THIRD WIRELESS COMMUNICATION UNIT
210 FIRST-WIRELESS-COMMUNICATION DATA
211 CONTROL INFORMATION
212 AUTHENTICATION DATA
300 AUTHENTICATION SERVER
303 SECOND WIRELESS COMMUNICATION UNIT
310 DATA BASE
312 AUTHENTICATION DATA
400 WIRELESS LAN
500 INTERNET
600 OTHER WIRELESS COMMUNICATION DEVICES

The invention claimed is:

1. A wireless communication system comprising:
a mobile terminal including a short-range wireless communication function; and
a wireless repeater, wherein
the wireless repeater is configured to:
hold at least control information for controlling a communication status of a first wireless communication path for short-range wireless communication, and first authentication data required to permit wireless communication with the wireless repeater using the first wireless communication path;
automatically permit connection without a manual operation when receiving a connection request using the first wireless communication path from the mobile terminal;
determine, when receiving an authentication request to which second authentication data is attached requesting a start of wireless communication with the wireless repeater using the first wireless communication path from the mobile terminal that has been in a connected status, whether to authenticate the authentication-request-source mobile terminal, based on a result of comparing the second authentication data attached to the authentication request from the mobile terminal with the first authentication data held in the wireless repeater; and
set, when the mobile terminal has been authenticated, the wireless repeater to a status for performing wireless communication with the mobile terminal using the first wireless communication path, wherein
the mobile terminal is configured to acquire third authentication data that is preset and preregistered in association with a serial number identifying the wireless repeater as the first authentication data for the wireless repeater in an authentication server installed on the Internet, and to use the second authentication data to be attached to the authentication request, and
the mobile terminal further includes a wide-area wireless communication function for wireless communication with the authentication server and is configured to use, when accessing the authentication server installed on the Internet to acquire the third authentication data, a second wireless communication path for wide-area wireless communication instead of the first wireless communication path to transmit an authentication data acquisition request with the serial number that identifies the wireless repeater to the authentication server.

2. The wireless communication system according to claim 1, wherein the mobile terminal is configured to, when performing an operation of transmitting the authentication request, generate a random number for authentication, generate hash data based on the generated random number for authentication and the second authentication data to be attached to the authentication request, and transmit, to the wireless repeater, the authentication request to which the hash data is attached instead of the second authentication data as the authentication request with the second authentication data, and the wireless repeater is configured to:

acquire the random number for authentication generated by the mobile terminal and generate hash data based on the acquired random number for authentication and the first authentication data held in the wireless repeater; and determine, when receiving the authentication request to which the hash data is attached as the authentication request with the second authentication data from the mobile terminal, whether to authenticate the authentication-request-source mobile terminal, based on a result of comparing the hash data attached to the authentication request from the mobile terminal with the hash data generated by the wireless repeater, instead of comparing the second authentication data attached to the authentication request from the mobile terminal with the first authentication data held in the wireless repeater.

3. The wireless communication system according to claim 1, wherein the wireless repeater is configured to permit, when the mobile terminal has been authenticated, the mobile terminal to access the control information held in the wireless repeater, and the mobile terminal is configured to access, when the mobile terminal has been authenticated, the control information held in the wireless repeater using the first wireless communication path to change settings of the control information in such a manner as to change a communication status of the first wireless communication path to an arbitrary desired status.

4. The wireless communication system according to claim 1, wherein the wireless repeater is configured to, as long as none of the mobile terminals are unconnected to the wireless repeater:

periodically output first wireless communication scan data indicating existence of the wireless repeater at a predetermined cycle using the first wireless communication path, and stop, when the mobile terminal has been in a status connected to the wireless repeater, outputting the first wireless communication scan data and to reject connection with any mobile terminals other than the connected mobile terminal.

5. The wireless communication system according to claim 4, wherein the wireless repeater is configured to, when detecting that the mobile terminal that has been authenticated disconnects wireless communication using the first wireless communication path, return the mobile terminal to an unauthenticated status from an authenticated status and to resume operation of periodically outputting the first wireless communication scan data that has been stopped.

6. The wireless communication system according to claim 1, wherein the first wireless communication path is employed via a Bluetooth Low Energy (BLE) communication mode in accordance with Bluetooth version 4.0.

7. A wireless communication method for a wireless communication system comprising a mobile terminal including a short-range wireless communication function, and a wireless repeater, the method comprising:

holding, by the wireless repeater, at least control information for controlling a communication status of a first wireless communication path for short-range wireless communication, and first authentication data required to permit wireless communication with the wireless repeater using the first wireless communication path;

automatically permitting, by the wireless repeater, connection without a manual operation when a connection request using the first wireless communication path is received from the mobile terminal;

determining, by the wireless repeater, when an authentication request to which second authentication data is attached requesting a start of wireless communication with the wireless repeater using the first wireless communication path is received from the mobile terminal that has been in a status connected, whether to authenticate the authentication-request-source mobile terminal, based on a result of comparing the second authentication data attached to the authentication request from the mobile terminal with the first authentication data held in the wireless repeater; and setting, by the wireless repeater, a status of the wireless repeater to a status for performing wireless communication with the mobile terminal using the first wireless communication path when the mobile terminal has been authenticated, wherein the mobile terminal acquires third authentication data that is preset and preregistered in association with a serial number identifying the wireless repeater as the first authentication data for the wireless repeater in an authentication server installed on the Internet-, and uses the second authentication data to be attached to the authentication request, and the mobile terminal further includes a wide-area wireless communication function for wireless communication with the authentication server and uses, when accessing the authentication server installed in the internet to acquire the third authentication data, a second wireless communication path for wide-area wireless communication instead of the first wireless communication path to transmit an authentication data acquisition request with the serial number that identifies the wireless repeater to the authentication server.

8. A non-transitory computer-readable medium storing a wireless communication program to be executed in a wireless communication system comprising a mobile terminal including a short-range wireless communication function and a wireless repeater by a computer mounted in the wireless repeater, the program causing the wireless repeater to execute:

holding at least control information for controlling a communication status of a first wireless communication path for short-range wireless communication, and first authentication data required to permit wireless communication with the wireless repeater using the first wireless communication path;

automatically permitting, when a connection request using the first wireless communication path is received from the mobile terminal, connection without a manual operation;

determining, when an authentication request to which second authentication data is attached requesting a start of wireless communication with the wireless repeater using the first wireless communication path is received from the mobile terminal that has been in a status connected, whether to authenticate the authentication-request-source mobile terminal, based on a result of comparing the second authentication data attached to the authentication request from the mobile terminal with the first authentication data held in the wireless repeater; and setting, when the mobile terminal has been authenticated, a status of the wireless repeater to a status for performing wireless communication with the mobile terminal using the first wireless communication path, wherein the mobile terminal acquires third authentication data that is preset and preregistered in association with a serial number identifying the wireless repeater as the first authentication data for the wireless repeater in an authentication server installed on the Internet-, and uses the second authentication data to be attached to the authentication request, and the mobile terminal further includes a wide-area wireless communication function for wireless communication with the authentication server and uses, when accessing the authentication server installed in the internet to acquire the third authentication data, a second wireless communication path for wide-area wireless communication instead of the first wireless communication path to transmit an authentication data acquisition request with the serial number that identifies the wireless repeater to the authentication server.

* * * * *